Dec. 13, 1955 H. P. LUHN 2,726,860

RECORD HANDLING MECHANISM FOR ACCOUNTING MACHINES

Filed Sept. 4, 1952 7 Sheets-Sheet 1

Inventor
HANS P. LUHN

By William Lang
Attorney

Dec. 13, 1955 H. P. LUHN 2,726,860

RECORD HANDLING MECHANISM FOR ACCOUNTING MACHINES

Filed Sept. 4, 1952 7 Sheets-Sheet 2

INVENTOR
HANS P. LUHN
BY William Lang
ATTORNEY

RECORD HANDLING MECHANISM FOR ACCOUNTING MACHINES

Filed Sept. 4, 1952 7 Sheets-Sheet 3

INVENTOR
HANS P. LUHN
BY William Lang
ATTORNEY

INVENTOR
HANS P. LUHN
BY William Lang
ATTORNEY

Dec. 13, 1955 H. P. LUHN 2,726,860

RECORD HANDLING MECHANISM FOR ACCOUNTING MACHINES

Filed Sept. 4, 1952 7 Sheets-Sheet 5

INVENTOR
HANS P. LUHN

BY William Lang
ATTORNEY

RECORD HANDLING MECHANISM FOR ACCOUNTING MACHINES

INVENTOR
HANS P. LUHN
BY William Lang
ATTORNEY

RECORD HANDLING MECHANISM FOR ACCOUNTING MACHINES

Filed Sept. 4, 1952 7 Sheets-Sheet 7

INVENTOR
HANS P. LUHN
BY William Lang
ATTORNEY

United States Patent Office 2,726,860

Patented Dec. 13, 1955

2,726,860

RECORD HANDLING MECHANISM FOR ACCOUNTING MACHINES

Hans P. Luhn, Armonk, N. Y., assignor to International Business Machines Corporation, New York, N. Y., a corporation of New York Application September 4, 1952, Serial No. 307,938

10 Claims. (Cl. 271—3)

This invention relates to sheet feeding and handling devices and more particularly to improved means for handling elements or tabulating cards in a record-controlled accounting machine.

The preferred embodiment of the invention illustrated in the drawings is adapted for installation on and coaction with the card feeding unit shown in United States Patents 1,926,883 and 2,042,324 issued to J. R. Peirce. In this card feed, which is of well known construction in the art, the cards are stacked in superposed position in a feed hopper where each bottom card is picked from the stack by a reciprocating picker knife and fed into the bite of the feed rolls where it is fed along a circular card path past the sensing brushes and delivered to a rotating drum which stacks the cards in the same order as they were originally.

In the prior use of such machines, the cards were removed from the file drawer in stacks of a size conveniently held in one hand, "joggled" to align them, and then placed in the feed hopper. After passage through the machine the cards were removed from the stacker and replaced in the file drawer, also by hand. With the increase in speed of operation of accounting machines, it becomes increasingly difficult for an operator to keep a machine supplied with cards.

Through the use of the present invention the operator is able to place a whole card storage drawer bodily into the machine and through operation of a suitable control lever remove the cards therefrom and position them for passage through the machine. The thus emptied drawer or another empty drawer is inserted in a second position in the machine and the cards that have passed through the machine are reinserted in the drawer in their original order.

An object of the invention is to provide means whereby the card capacity of a record-controlled accounting machine may be increased so as to lengthen the unattended running time of the machine.

A further object is to provide means which enable the machine operator to effect a more rapid loading and unloading of the cards without any interruption in the operation of the accounting machine.

A still further object is to provide means which insure the proper sequential manual operation of the various structural elements constituting this invention so as to prevent any misoperation by the operator that might result in spilled or mutilated cards.

Specifically, it is the object of this invention to provide a card storage drawer and structure operatively associated with the card feeding mechanism of an accounting machine which will coact with the card storage drawer in one position to remove the cards therefrom for passage through the machine, and with the drawer in a second position to stack those cards which have passed through the machine into the drawer.

Other objects of the invention will be pointed out in the following description and claims and illustrated in the accompanying drawings, which disclose, by way of example, the principle of the invention and the best mode, which has been contemplated, of applying that principle.

Figure 1:
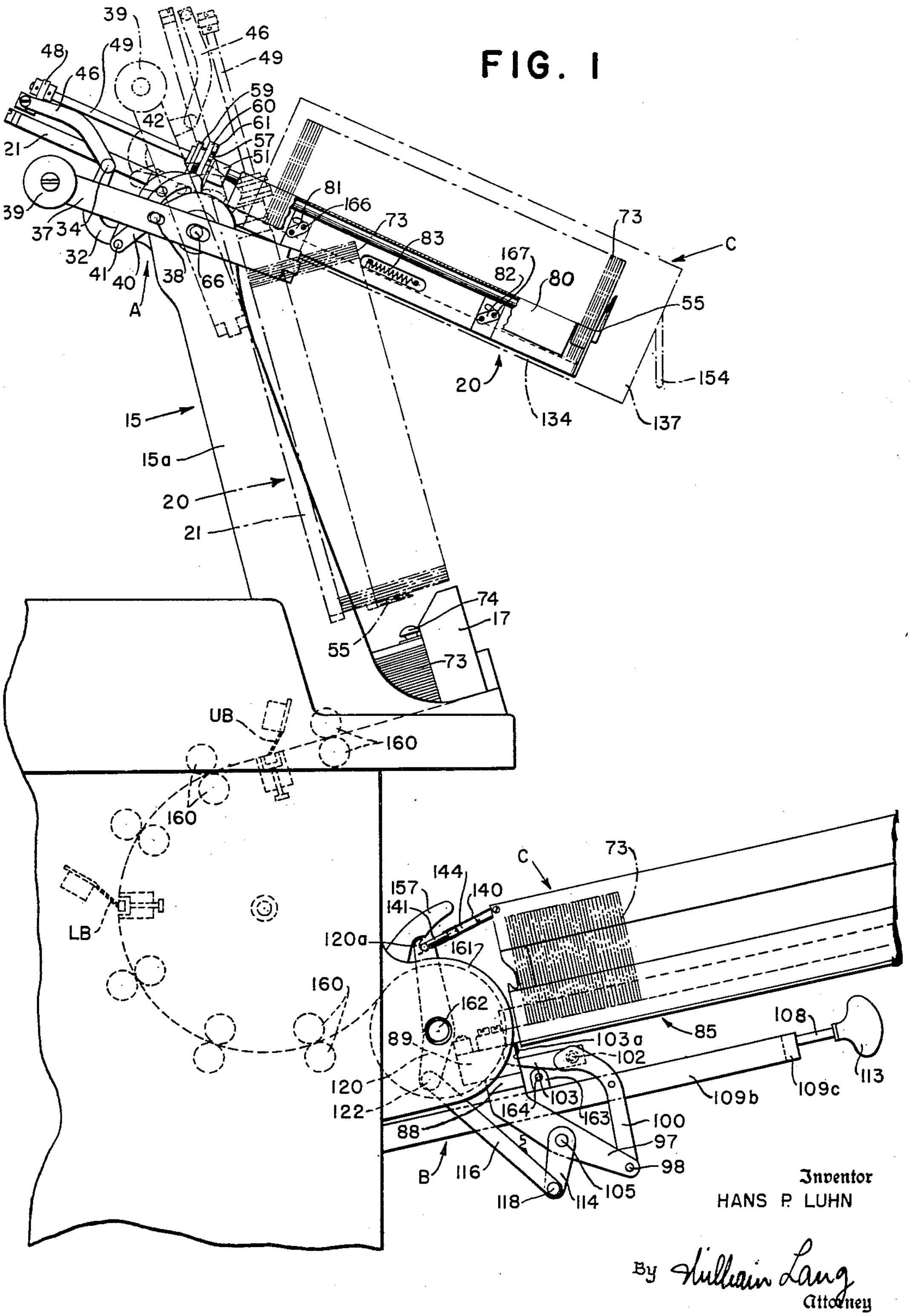
Fig. 1 is a side elevation showing the card handling mechanism of this invention in cooperative relationship with the card feeding mechanism of an accounting machine.

The mechanism of the present invention is comprised principally of three units; the card feed unit, the card stacker unit, and the card storage drawer or holder, generally designated A, B and C, respectively, in Fig. 1, where they are shown in their relative operating positions on an accounting machine of a construction well known in the art.

*The card feed unit*

Figures 2, 6:
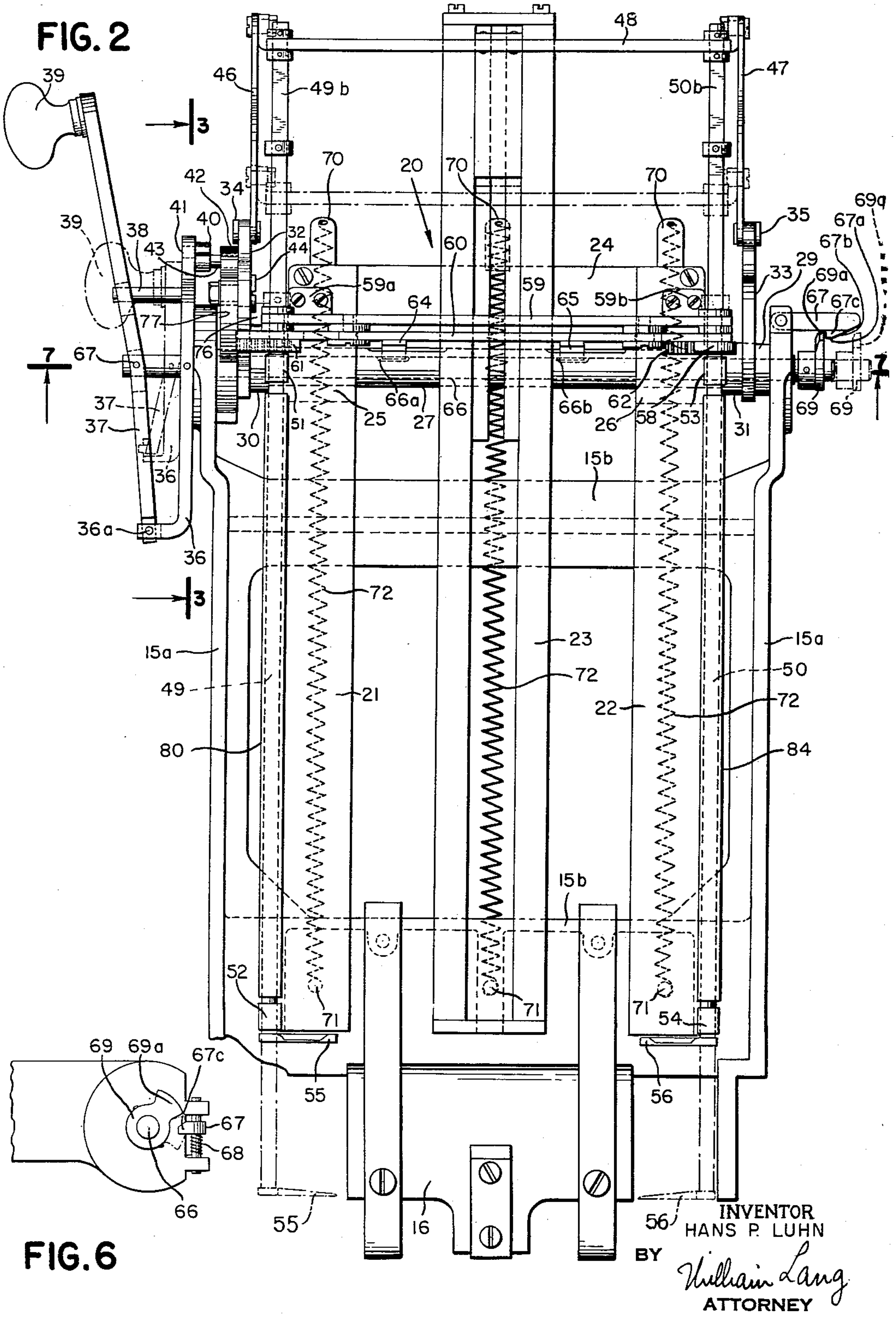
Fig. 2 is a plan view of the card feeding unit.
Fig. 6 is a detail view of the latch mechanism for locking the card fingers in an operative position.

The card feed unit A (Figs. 1 through 7) is secured to the card hopper or magazine of the feed head disclosed in the above mentioned patents to Peirce and replaces the conventional front card guide and throat block. Referring now to Fig. 1, a frame 15 is secured to the existent side frame members of the Peirce structure. Frame 15 is comprise of two side members designated **15*a* joined by two transverse webs 15*b* (Fig. 2). The lower web 15*b* of frame 15 has a throat block 16 secured thereto and has the configuration generally of the front card guide it replaces, so that the feeding action of the bottom card of the stack is unchanged over Peirce. Additional card guides 17** (Fig. 1) are provided to abut the ends of the cards so as to align them lengthwise for proper entry through the throat.

The two side members **15*a* of the frame 15 extend upwardly beyond the upper transverse web 15*b* (Fig. 2) and have journalled therein a second or pivoted frame 20 and its associated operating structure. The pivoted or movable frame 20 comprises generally two side rails 21 and 22, center rail 23, and a single cross member 24 connecting the rails 21, 22, and 23 in parallel relationship. Secured to the cross member 24 are aligned tubular bosses 25 and 26 through which extend a tubular shaft 27. The tubular shaft extends transversely of frame 15 and is journalled in flanged bushings 28 and 29 (Figs. 6 and 7) fixed in side members 15*a* of frame 15. Affixed to the tubular shaft 27 are links 30 and 31 which rotate between the bushing 28 and the boss 25, and between the bushing 29 and the boss 26, respectively, to secure the shaft 27 against axial movement and the pivoted frame 20 against transverse movement relative to the frame 15**.

To the hubs 30 and 31 are fastened crank arms 32 and 33 (Fig. 2), respectively, having the pinned joints 34 and 35 equi-angularly disposed relative to the shaft. The bushing 28 (Figs. 6 and 7) rotates freely in the frame 15 and extends therethrough to fixedly receive a crank arm 36. A second crank arm 37 is pivoted to the first crank arm 36 at the ends of the arms, as shown at 36*a*. A slot in crank arm 37 coacts with a pin 38 in the arm 36 so that the two arms rotate with the shaft. An operating knob 39 is secured to crank arm 37.

Figure 8:
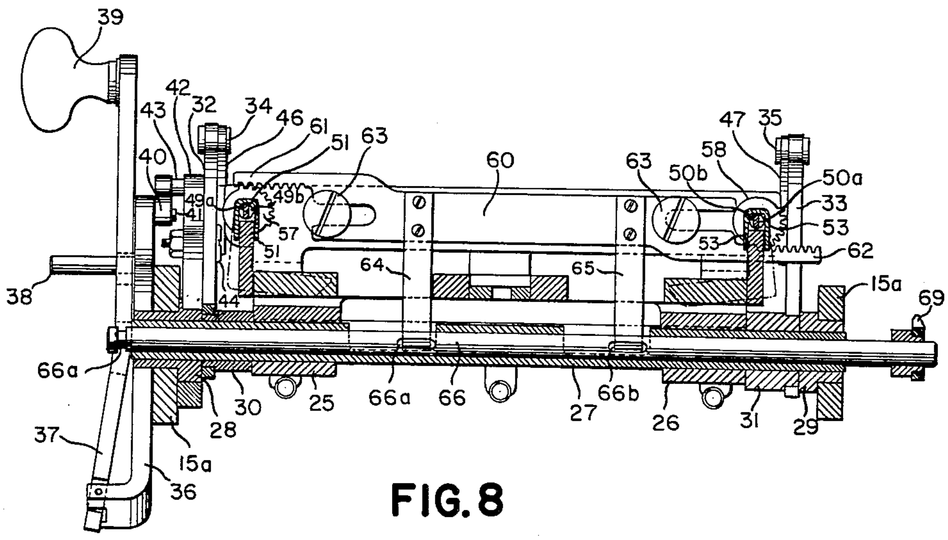
Fig. 8 is a sectional view similar to Fig. 7 showing the parts in a different operative position.

Crank arm 36 is connected to crank arm 32 through a toggle link arrangement. A link 40 is pinned to crank arm 36 at 41 and in turn has a pivotal pin connection with a latch arm 42 at 43 (Figs. 2 and 8). The latch arm 42 is pivotally mounted on arm 32 by pivot screw 44. A spring 45 extends between a stud 42*a* on latch arm 42 and a stud 32*a* on arm 32 to bias the latch arm 42 in a counterclockwise direction as viewed in Figs. 1, 3 and 4.

It is thus seen that a toggle linkage is formed wherein a clockwise rotation of crank arm 36, as viewed in Figs. 3, 4 and 5, produces a clockwise rocking of latch arm 42 about its pivot screw 44, and conversely for counterclockwise rotation of arm 36, the latch 42 is restrained in its rocking action in both clockwise and counterclockwise directions by coaction with notched cam described hereinafter. Thus restrained, the latch arm 42 provides a driving connection from crank arm 36 through the linkage described above to arm 32 which is pinned to shaft 27. Movement of shaft 27 effects movement of arm 33 which is also pinned to shaft 27 (Fig. 2).

Crank arms 32 and 33 have pinned joints 34 and 35, hereinbefore referred to, which connect links 46 and 47 to arms 32 and 33 respectively, as shown in Fig. 2. Links 46 and 47 are fastened to a transverse member 48 which is slidably mounted in ways in the center rail 23 of the movable frame 20 through an L-shaped extension member 48*a*. The transverse member 48 journals a pair of shafts 49 and 50 at their upper ends with collars abutting the member 48 so that the shafts are free to rotate but constrained to reciprocate with the member 48. The shaft 49 is further journalled in channel sections 51 and 52 which straddle the side rail 21 to form a bearing for the shaft. Similarly the shaft 50 is journalled in channel sections 53 and 54 which straddle the side rail 22. Referring now to Figs. 1, 4 and 5, a channel section 80 is provided to fit over the extended leg of side rail 21. Arms 81 and 82 are pivotally connected to rail 21 and channel 80. A pin 166 extends through an arcuate slot in rail 21 to connect the arms 81. A similar pin 167 extends through a second arcuate slot in rail 21 to connect arms 82. The arcuate slots serve to limit the distance through which channel section 80 may travel. A tension spring 83 extends between rail 21 and channel 80 to continually urge channel 80 away from its seat on rail 21. Side rail 22 is provided with a channel section 84 (Fig. 2) which has similar structure (not shown) to urge it away from rail 22. The function of channels 80 and 84 will be described later in connection with the storage drawer designated C in Fig. 1.

A pair of flat angle-shaped card fingers 55 and 56 (Figs. 2, 4 and 5) are fixed to the lower ends of shafts 49 and 50, respectively, these fingers being symmetrically disposed relative to the midpoint between the centers of shafts 49 and 50. The shafts 49 and 50 are each provided with chordal flats 49*a*, 49*b* and 50*a*, 50*b* (Fig. 8) which snugly fit into holes in gear segments 57 and 58, respectively. These segments 57 and 58 are mounted for rotation on a transverse frame member 59 which is affixed to the side rails 21 and 22 of the movable frame 20 by means of angle-shaped legs 59*a* and 59*b*. A transverse rack member 60 carries a duo of rack sections 61 and 62 (Figs. 6 and 7) which are positioned to mesh with gear segments 57 and 58, respectively. It should be noted that gear segments 57 and 58 are oppositely positioned with respect to one another in order to provide opposite directions of rotation of the shafts 49 and 50. The rack member 60 is guided for transverse movement by a pair of dowel screws 63 which are secured in the transverse frame member 59 and are adapted to receive a pair of slots formed in the end portions of rack member 60.

A pair of angularly shaped support members 64 and 65 (Figs. 2 and 7) extend downwardly from rack member 60 and project through cutaway portions of tubular shaft 27 and into sockets 66*a* and 66*b* in a solid shaft 66 which is mounted for movement and enclosed in the tubular shaft 27. The shaft 66 extends beyond the tubular shaft at both ends and passes through a slot in crank arm 37. Shaft 66 is operatively connected for lateral movement to crank arm 37 by means of a pin 67 which extends through the slot in arm 37 to be seated in a circumferential groove 66*a* in shaft 66. The arm 37 is hinged with respect to the crank arm 36 about an axis parallel to a tangent to the shaft 66 so that movement of the arm 37 about this axis effects a lateral movement of the shaft 66 in the same direction that arm 37 is moved. Shafts 49 and 50 are rotated by movement of arm 37 through the gear and rack mechanism described above to place card fingers 55 and 56 in an operative or inoperative position.

The rotation of card fingers 55 and 56 is interlocked by the angular position of the movable frame 20 relative to the stationary frame 15. To side frame member 15*a* on the side opposite crank arm 36 is pivotally mounted a latch member 67 (Fig. 2).

Latch 67 extends outwardly from side frame member 15*a* approximately parallel to shaft 66 and has a raised latch surface 67*a* extending toward shaft 66. A camming surface 67*b* slopes from latch surface 67*a* toward the end of latch 67. A second camming surface 67*c* (Fig. 6) slopes from the latch surface 67*a* toward the top of latch 67. A wire spring 68 continually urges latch 67 toward shaft 66. The latch 67 coacts with a latch plate 69 fixed to shaft 66. Latch plate 69 has an arcuate surface 69*a* and is so positioned on shaft 66 that surface 69*a* of plate 69 engages latch 67 when the movable frame 20 is in all positions except that where it lies flat abutting the stationary frame 15.

Cross member 24 of movable frame 20 (Fig. 2) is provided with a trio of lugs 70 which extend downwardly to a position below the plane of the transverse webs 15*b* of frame 15. A trio of studs 71 project downwardly from the lower transverse web 15*b* of frame 15. A coil spring 72 connects each lug 70 with a stud 71 to constantly bias frame 20 in a counterclockwise direction, as viewed in Fig. 1.

*Operation of the card feed unit*

The operation of the feed unit A will now be described. It has already been mentioned that the feed unit A is secured to the card hopper or magazine of the feed head of the tabulating machine. In order to allow a machine operator to place a whole card storage drawer C containing a stack of cards 73 bodily into the machine, the movable frame 20 is swung in a counterclockwise direction, as viewed in Fig. 1, away from fixed frame 15. It is to be understood that the storage drawer C is not limited to use with cards alone, but has utility when used with other elements of like dimensions. The drawer C is then mounted on frame 20 and card fingers 55 and 56 are rotated into active position. The drawer C is removed and placed in position on the stacker unit B as shown in the lower portion of Fig. 1. The cards 73 are held in place by the fingers 55 and 56 and the frame 20 is swung in a clockwise direction until it again lays flat against frame 15 as shown in Fig. 4. The card fingers 55 and 56 are then extended to deposit cards 73 into the feed hopper (Fig. 5). Then, card fingers 55 and 56 are rotated to an inactive position to permit cards 73 to be fed into the machine by conventional card feeding mechanism shown at D in Fig.

5. A weight member 74 (Fig. 5) may be placed on the top of the stack of cards 73 so that the last few cards are urged into cooperation with the feeding mechanism D which operates underneath the stack. The card fingers 55 and 56 are retracted before frame 20 is again swung away from frame 15 to receive another stack of cards.

Figures 3, 4, 5:
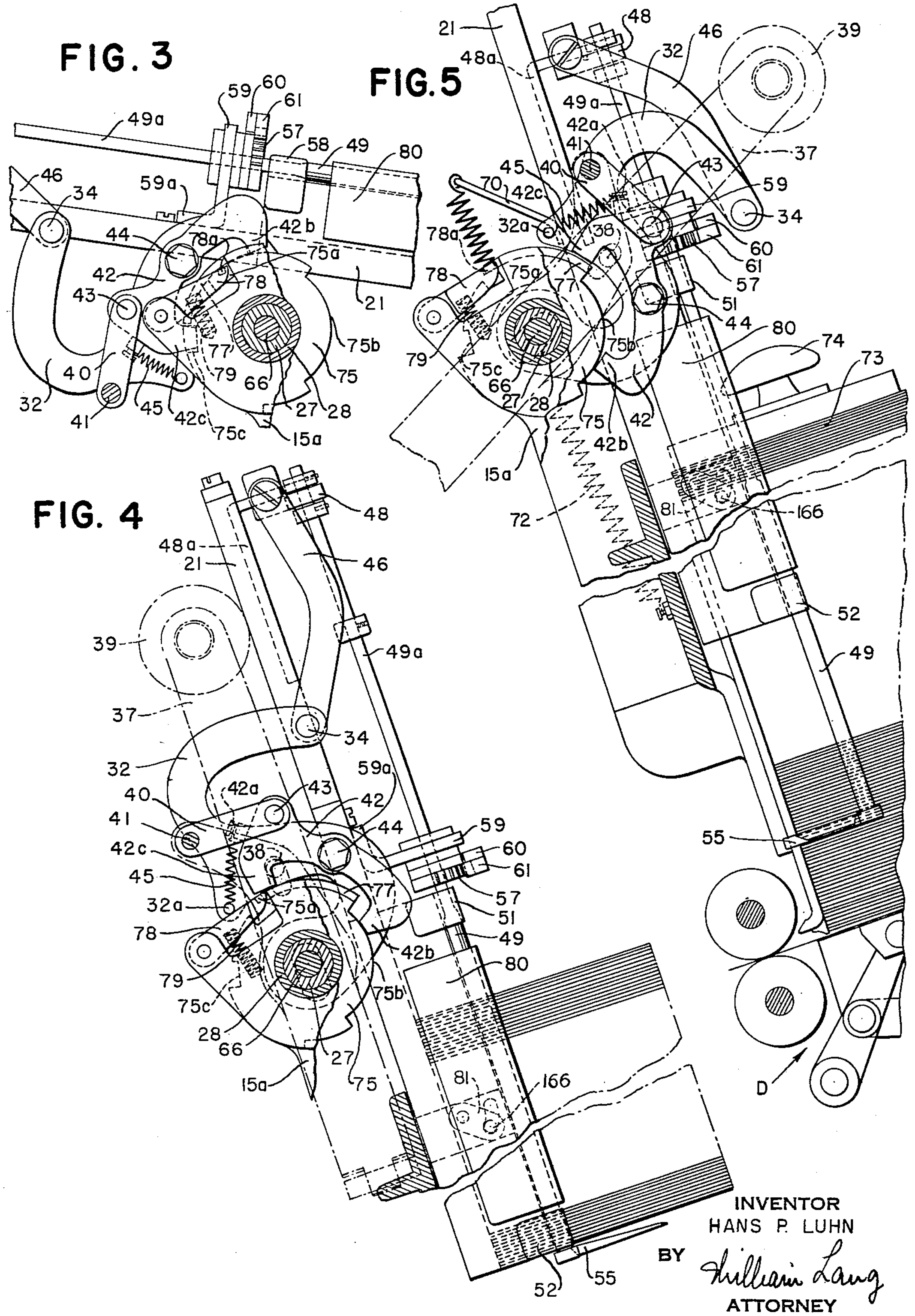
Fig. 3 is a sectional view taken along lines 3—3 of Fig. 2.
Fig. 4 is a sectional view similar to Fig. 3 showing the parts in a different operative position.
Fig. 5 is a detail sectional view similar to Fig. 3 showing the parts in another operative position.
Figure 7:
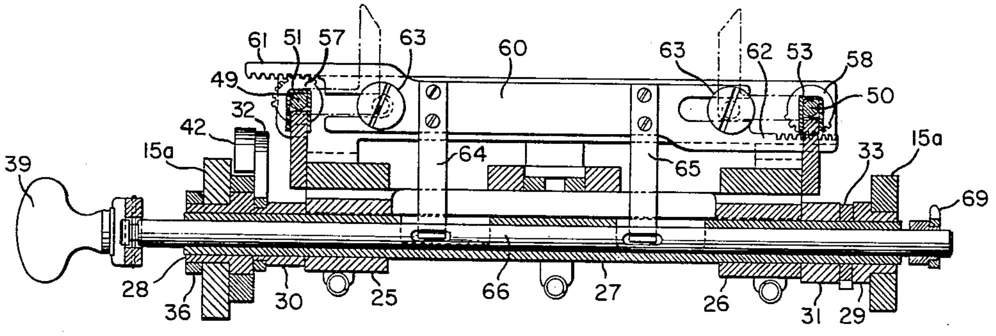
Fig. 7 is a sectional view taken along lines 7—7 of Fig. 2.

Referring now to Fig. 3, the toggle link mechanism which operates the movable frame 20 is shown in the position where frame 20 is swung counterclockwise away from fixed frame 15. A notched cam 75 is secured to side member 15*a* of frame 15. Cross member 24 of frame 20 carries a support arm 76 (Fig. 2) to which is secured an arcuate plate 77 adapted to ride on the surface of cam 75. Latch arm 42 is formed with a pair of protruding legs 42*b* and 42*c* which are spaced apart sufficiently to receive plate 77 between them. To move frame 20 to the position shown in Fig. 3, crank arm 37 is rotated in a counterclockwise direction about a pivot point located at the center of shaft 66. Crank arm 36 and the connected linkage described previously are shifted in turn to move latch arm 42 in a counterclockwise direction from the position shown in Fig. 4.

A latch 78 (Figs. 3, 4, 5) is pivotally mounted in a grooved portion of side frame member 15*a*. A compression spring 79 is interposed between frame member 15*a* and latch 78 to continually urge latch 78 away from frame member 15*a*. Latch 78 has a projecting portion 78*a* which extends into a depression 75*a* on the surface of cam 75. Referring now to Fig. 4, the mechanism which operates the movable frame 20 is shown in position at a time immediately before card fingers 55 and 56 are extended to the position shown in Fig. 5. The same position is assumed by arm 42 with relation to cam 75 immediately before the moving of frame 20 away from frame 15. It is thus seen from Fig. 4 that leg 42*b* of latch arm 42 is resting in a depression 75*b* on the surface of cam 75 before the counterclockwise rotation of arm 42 is effected. When arm 42 is moved counterclockwise to a point where leg 42*c* leaves the surface of plate 77 which is resting on the surface of cam 75, the tension of spring 45 overcomes the force exerted by spring 79 on latch 78 to depress the latch 78 into depression 75*a* and allow leg 42*c* of latch arm 42 to drop behind the trailing edge of plate 77 through a further counterclockwise rotation about pivot screw 44. This additional movement of latch arm 42 causes leg 42*b* to be raised slightly above the edge of depression 75*b* to a position where it can engage the leading edge of plate 77 upon further movement counterclockwise. As latch arm 42 continues its counterclockwise movement, plate 77 is moved with it to rotate frame 20 outwardly and away from fixed frame 15. The movement is continued until latch arm leg 42*c* is further pivoted in a counterclockwise direction about pivot screw 44 through tension of spring 45 by dropping into a depression 75*c* in the surface of cam 75. The trailing edge of depression 75*c* acts to stop any further counterclockwise movement of latch arm 42. The frame 20 is not locked in the raised position of Fig. 3 but is held biased away from frame 15 by coil springs 72 as explained hereinbefore. Also, the force of friction between latch arm leg 42*c* and the leading edge of depression 75*c* assists in holding frame 20 in the raised position.

After the frame 20 has been thus raised, the card storage drawer C containing a stack of cards 73 is mounted on frame 20 in a manner described hereinafter. Referring now to Fig. 8, crank arm 37 is in the extreme right position where its shank portion rests against crank arm 36 and the card fingers 55 and 56 are in the inoperative position shown in Fig. 5 but not extended. Movement of crank arm 37 to the extreme left position as shown in solid lines in Fig. 2 causes shaft 66 which is connected to arm 37 to be shifted to the left. Rack member 60 moves with shaft 66 to rotate shafts 49 and 50 through gear segments 57 and 58. Shafts 49 and 50 have opposite directions of rotation, as explained hereinbefore, shaft 49 moving counterclockwise and shaft 50 moving clockwise, as viewed in Fig. 7. Card fingers 55 and 56 are rotated with shafts 49 and 50, respectively, to the operating position shown in Figs. 2 and 4.

In order to guard against any lateral shift of shaft 66 which would move card fingers 55 and 56, a locking device is provided comprising latch 67 and latch plate 69 (Figs. 2, 6), as described hereinbefore. With frame 20 raised, movement of shaft 66 to the extreme left position causes arcuate surface 69*a* of latch plate 69 to contact surface 67*b* of latch 67 to cam latch 67 away from latch plate 69 against the pressure of wire spring 68 and allow plate 69 to fall behind raised surface 67*a*. It is thus seen that any lateral movement of shaft 66 is prevented by latch 67.

With the card fingers 55 and 56 moved to the operative position shown in Fig. 4, the card storage drawer C is removed from frame 20 and placed in position on the stacker unit B (Fig. 1) in a manner described later. The cards 73 are held in place on frame 20 by fingers 55 and 56 as shown in Fig. 1. Crank arm 37 is then rotated in a clockwise direction, as viewed in Fig. 3, causing latch arm leg 42*c* to leave depression 75*c* in cam 75 and engage the trailing edge of arcuate plate 77 to move it clockwise until frame 20 again lays flat against frame 15. It should be noted that shaft 66 is also rotated clockwise through support members 64 and 65 which connect it to movable frame 20. The rotation is sufficient to enable the arcuate surface 69*a* of latch plate 69 to move to one side of the raised surface 67*a* of latch 67 so that latch 67 no longer can obstruct lateral movement of shaft 66. At this point continued movement of crank arm 37 in a clockwise direction causes latch arm leg 42*c* to lose contact with the trailing edge of plate 77 and ride upon the surface of plate 77. This is accomplished by a clockwise rotation of arm 42 about pivot screw 44 which allows leg 42*b* to drop into depression 75*b* of cam 75, thereby assuming the position shown in Fig. 4. Further rotation of crank arm 37 in a clockwise direction to the position shown in dotted lines in Fig. 5 causes the toggle linkage described hereinbefore to move links 46 and 47 to the position of Fig. 5, thereby causing transverse member 48 to slide downwardly guided by the ways in center rail 23 of frame 20. Shafts 49 and 50 move with transverse member 48 to extend the card fingers 55 and 56 into the feed hopper of the machine.

The extending of card fingers 55 and 56 permits the stack of cards 73 to drop with them into the machine feed hopper. Crank arm 37 is then moved to the extreme right position shown by the dotted lines in Fig. 2, causing shaft 66 to be shifted to the right. Shafts 49 and 50 are again rotated through the rack member 60 and gear segments 57 and 58, respectively, to rotate card fingers 55 and 56 to their inoperative position, as shown in dotted lines in Fig. 2. With the card fingers 55 and 56 withdrawn from the path of cards 73, the cards can be fed into the machine by the conventional card feeding mechanism shown at D in Fig. 5. The machine operator may then place the weight member 74 on the top of the stack of cards 73 and retract card fingers 55 and 56 by moving crank arm 37 to the position shown in Fig. 5.

The cards 73 are moved in a circular path by a track, as shown in Fig. 1, and are presented to two sets of analyzing brushes UB and LB which sense perforations in the cards. The feeding of the cards through the analyzing brushes UB and LB is effected by concentrically arranged pairs of feeding rollers 160 which frictionally grip the cards as they are fed from the feed unit A and cause them to be fed in a direction determined by the shape of the track plates, as described in detail in the forementioned patents to Peirce. The cards 73 pass from the last pair of rollers 160 to any suitable stacking device such as that designated by reference character 161 and into the stacker unit C to stack one behind the other in precisely the same order they were in originally. Stacking drum 161 is carried by a shaft 162 which is driven from the main driving mechanism of the machine as shown in detail in the forementioned Peirce patents.

*The card stacker unit*

The card stacker unit or receiving station B (Figs. 1, 9, 10, 11) is secured to the tabulating machine to replace the conventional stacking pocket disclosed in the forementioned patents to Peirce. Referring now to Fig. 1, a frame 85 is secured to the existent side frame members of the Peirce structure. Frame 85 is comprised of two side rails 86 and 87 (Fig. 9) joined at one end to a cross member 88 through mounting blocks 89 and a center rail 90 fastened to cross member 88 through support bars 91. The two side rails 86 and 87 have an angle shaped cross-section, one leg of which extends upwardly. A channel section 92 is provided to fit on top of the upwardly extending leg of side rail 86. Arms 93 and 94 are pivotally connected to rail 86 and channel 92 to allow the channel section to swing upwardly and to the right, as viewed in Figs. 10 and 11, while limiting the total displacement of channel 92 away from side rail 86. Side rail 87 is provided with a channel section 95 (Fig. 9) which has similar structure (not shown) to permit movement of channel 95 away from rail 87. The function of channels 92 and 95 will be described later in connection with the storage drawer designated C in Fig. 1.

A pair of brackets 96 and 97 (Fig. 9) extend downwardly from the under side of cross member 88 and support a rod 98 between their lower extremities. A duo of arms 99 and 100 are pivotally mounted on rod 98 and maintained at a set distance from one another by spacer 101. Arms 99 and 100 are interconnected at their free ends by a pin 102. A U-shaped member 103 is pivotally mounted on pin 102 between arms 99 and 100. The legs of member 103 have upturned ends which have flat surfaces 103*a* disposed in a direction transverse to frame 85. A wire spring 104 urges member 103 upwardly until the surfaces 103*a* engage the under side of center rail 90. A sub-frame 109 is secured to the under side of cross member 88 and to an existent frame member in the accounting machine. A coil spring 111 connects sub-frame 109 to arm 99 to urge interconnected arms 99 and 100 in a counterclockwise direction, as viewed in Figs. 10 and 11, about rod 98. The counterclockwise rotation of arms 99 and 100 is limited by the flat surfaces 103*a* of member 103 which encounter support bars 91 of frame 85 as shown in Fig. 10.

Brackets 96 and 97 also support a shaft 105 for rotation which projects through each bracket at approximately its midpoint. Fixed to shaft 105 is a gear segment 106 (Figs. 10, 11) which meshes with a rack 107 secured to the end of a pull rod 108. The rod 108 is mounted for movement in sub-frame 109 which comprises two side members 109*a* and 109*b* held together by cross bars 109*c* and 109*d*. Rod 108 extends through bar 109*c* and is free to move horizontally within side members 109*a* and 109*b*, but is restricted in vertical motion by a channel member 110 fastened to the end of rack 107 and engaging the top and bottom portions of member 109*a* to guide rod 108 in its movement. Rod 108 passes through a coil spring 112 which is interposed between cross bar 109*c* and a stud projecting from rod 108 and acts when compressed to push rod 108 to the left as viewed in Figs. 10 and 11. An operating knob 113 is secured to the free end of rod 108. Rack 107 carries a pair of brackets 163 which rotatably support a cross rod 164 having contact rollers 165 mounted thereon. Brackets 163 move with rack 107 to bring rollers 165 into engagement with arms 99 and 100 and move them in a clockwise direction about rod 98 against the pressure of spring 111.

Links 113 and 114 (Figs. 9, 10, 11) are fixed on shaft 105 to the portions which project through brackets 96 and 97, respectively. A pair of connecting links 115 and 116 are pivotally mounted on the free ends of links 113 and 114 at 117 and 118 to connect them with a pair of operating arms 119 and 120 through pivotal connections 121 and 122, respectively. Operating arm 119 and 120 are freely mounted on shaft 162 which carries the stacker 161. The free ends of operating arms 119 and 120 are cut out to form hooked fingers 119*a* and 120*a* which are adapted to engage a gate member on drawer C as explained hereinafter. It is thus seen that any rotation of shaft 105 causes a similar rotation of operating arms 119 and 120 through the linkage described above.

Center rail 90 is comprised of two side channels 90*a* and 90*b* (Fig. 9), the open portions of which face each other to provide a track for a rectangular block 123. Cross bars 90*c* and 90*d* join the ends of side channels 90*a* and 90*b* together. The block 123 is mounted on rollers 124 which freely move within channels 90*a* and 90*b*. A screw 156 is supported by a downwardly extending portion of cross bar 90*d* and serves as a stop to prevent block 123 from leaving channels 90*a* and 90*b*. The central portion of block 123 is cut out to receive a rod 125 (Figs. 10, 11) which has pivotally mounted thereon a stop plate 126. The stop plate 126 is of sufficient length to extend slightly beyond the edge of block 123 when it is pivoted about rod 125 to the position shown in Fig. 10. A wire spring 127 is wound around rod 125 to constantly urge stop plate 126 in a counterclockwise direction about rod 125 to the position shown in Fig. 11. The stop plate 126 is provided with a tail portion 126*a* and is prevented from rotating further counterclockwise by a pair of shoulders 126*b* which engage the top of block 123 as shown in Fig. 9.

Figure 9:
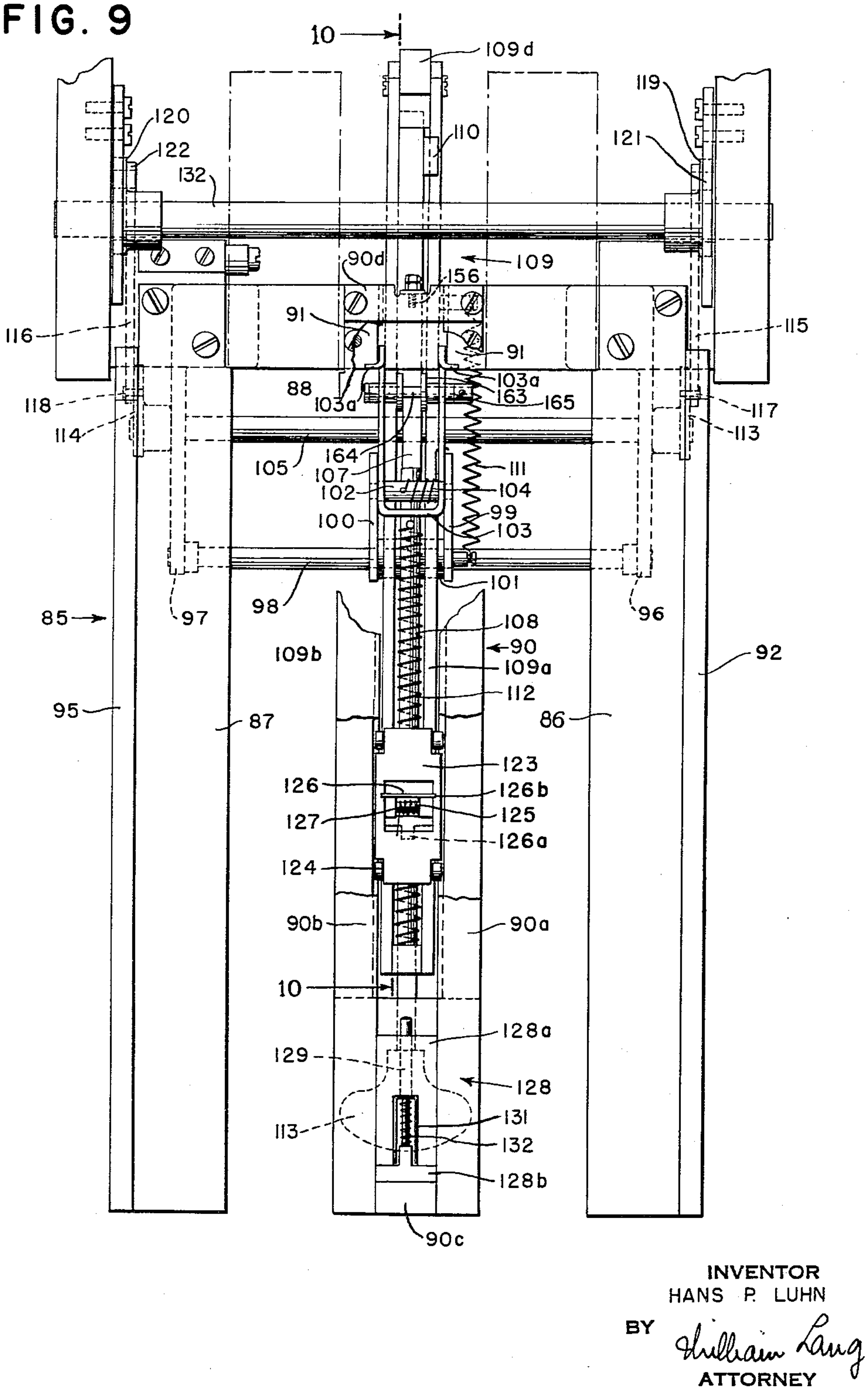
Fig. 9 is a plan view with parts broken away of the card stacker unit.
Figures 10, 11:
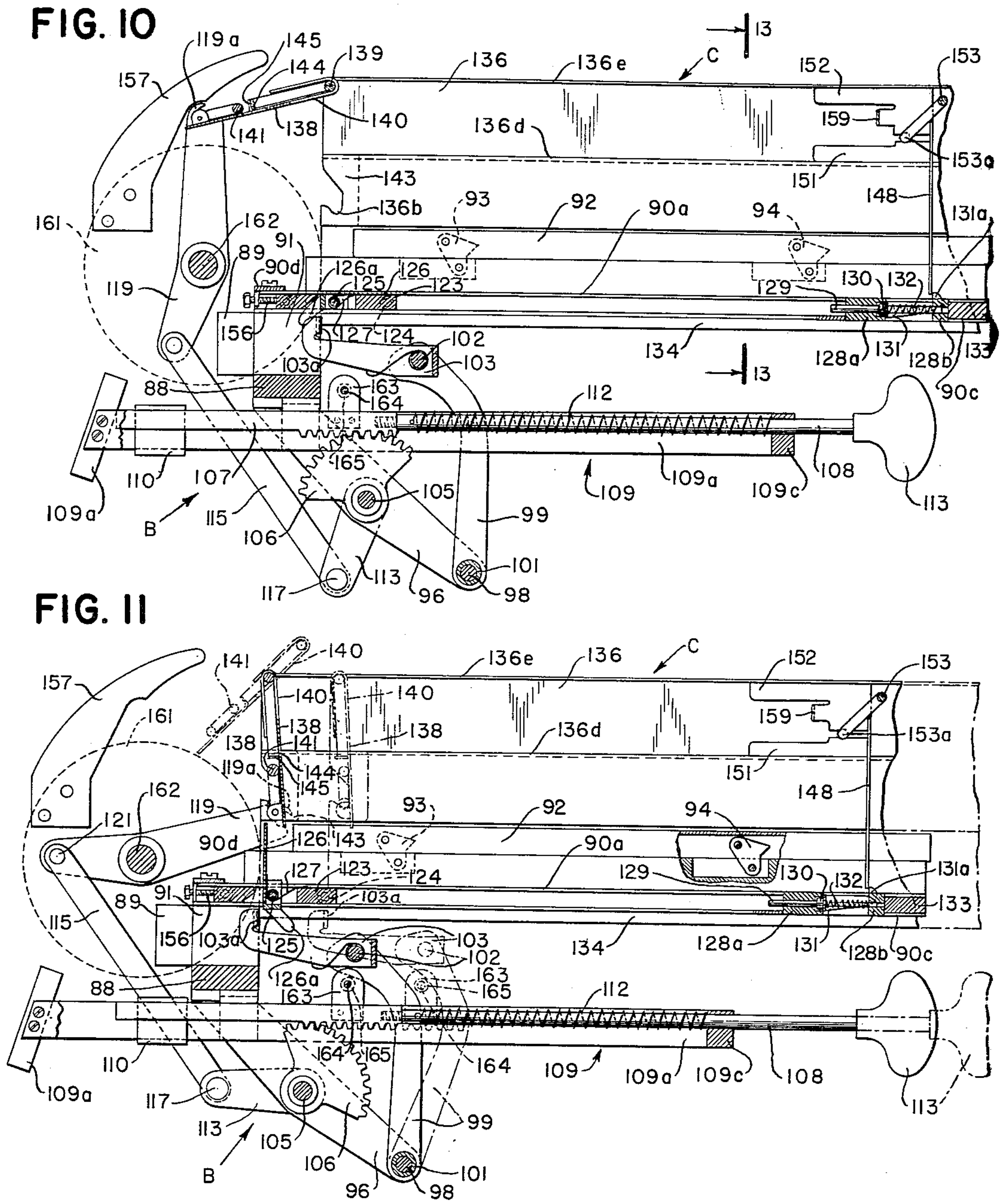
Fig. 10 is a sectional view taken along lines 10—10 of Fig. 9 showing the card storage drawer in position to receive cards from the accounting machine.
Fig. 11 is a sectional view similar to Fig. 10 showing the parts in a different operative position.

It is seen from Fig. 9 that a block 128 is secured between side channels 90*a* and 90*b* of center rail 90 near cross bar 90*c*. Block 128 comprises a U-shaped member 128*a* and a T-shaped member 128*b*, the leg of member 128*b* extending into the space between the legs of member 128*a* for a distance sufficient to leave an opening in the center of block 128. A push rod 129 is slidably mounted in block 128 and carries a stop plate 130 (Figs. 10, 11) thereon which moves within the opening in block 128 and limits the stroke of rod 129. A U-shaped member 131 is also secured on rod 129 adjacent to plate 130, the legs of which extend outwardly into the opening and are provided with raised surfaces 131*a*. A coil spring 132 is wound around rod 129 within the opening in block 128 and extends between the end of the leg of member 128*a* and member 131 to urge rod 129 to the left as viewed in Figs. 10 and 11. It is noted that rod 129 is thus held in a position where a portion of it projects out from block 128 to allow engagement by movable block 123. If pressure is exerted by block 123 on rod 129, the rod is pushed to the right against the resistance of spring 132 and carries member 131 to the right with it. The extended legs of member 131 close electrical contacts when moved to the extreme right position. Block 123 will only exert pressure on rod 129 when the card capacity of the storage drawer C is exceeded. An insert 133 of insulated material is positioned in the center of cross bar 90*c* to provide a seat for the electrical contacts.

When the electrical contacts are closed, the start interlock circuit (not shown) of the accounting machine is disabled to cause interruption of machine operation. Upon removal of the cards, the electrical contacts are again opened to permit operation of the machine. It is thus seen that provision is made to prevent overloading the storage drawer.

*The card storage drawer*

Figure 12:
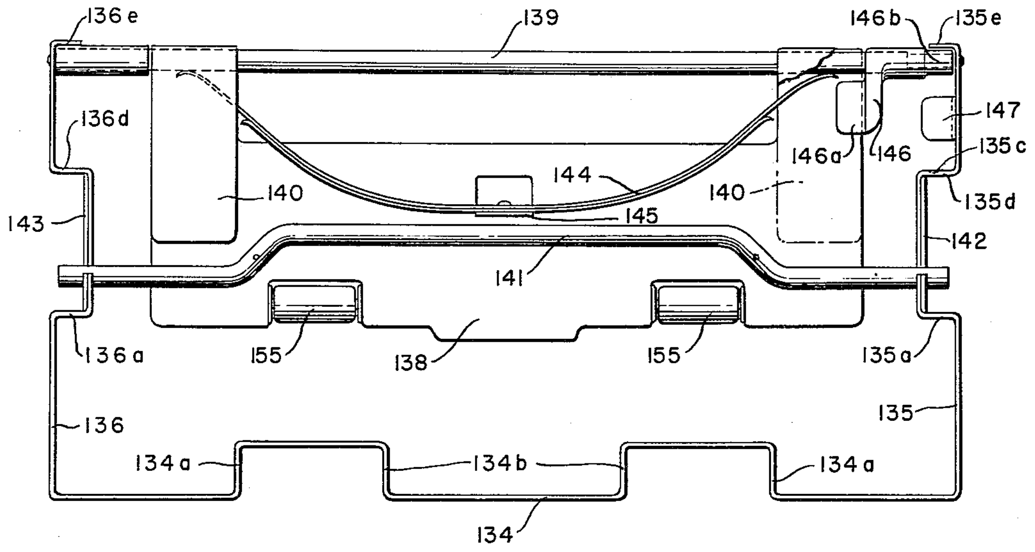
Fig. 12 is an end view of the card storage drawer.
Figure 13:
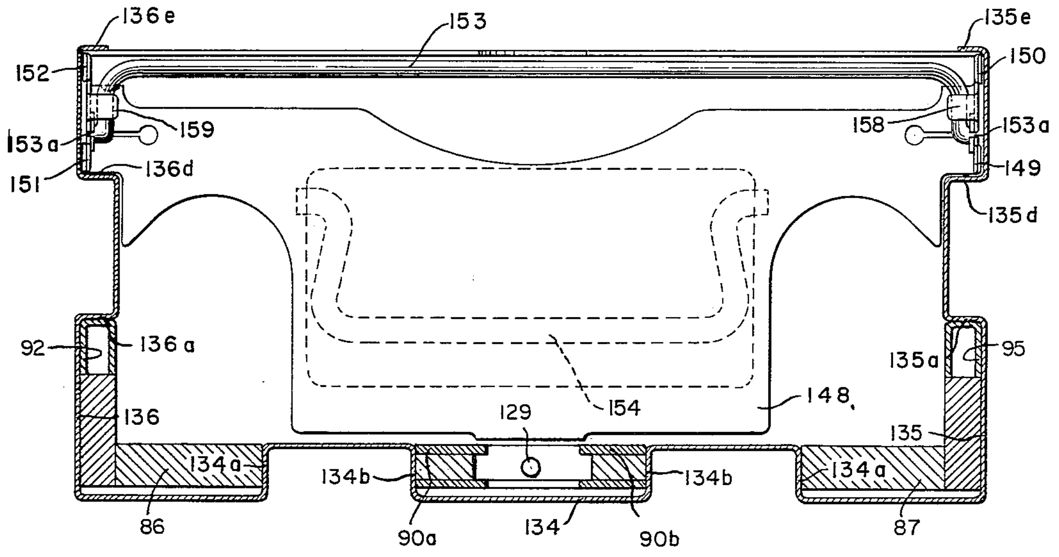
Fig. 13 is a sectional view taken along lines 13—13 of Fig. 10 showing the card follower in the card storage drawer.

The card storage drawer C (Figs. 1, 10, 11, 12 and 13)

which functions as a card holder is constructed in such a manner as to slide in place on both the card feed unit A and the card stacker unit B. Referring now to Figs. 1 and 12, it is seen that storage drawer C is formed in the shape of a rectangular box having an open top and a pivoted gate in place of a front vertical side member. In forming the box, a base 134 and sides 135, 136 are preferably made from one piece of material, and pressed or hammered to the shape shown in Fig. 12. An end member 137 is then fastened to base 134 and sides 135, 136. Since the method of making the storage drawer C does not comprise any part of this invention, other convenient methods may be used.

The base 134 is formed with inwardly extending flanges **134*a* (Fig. 12) which cooperate with flanges 135*a* and 136*a* which are formed in sides 135 and 136, respectively, to provide a pair of guiding pockets in which side rails 22 and 21 of movable frame 20 and side rails 87 and 86 of card stacker frame 85 are free to move. Base 134 is also formed with flanges 134*b* which provide a guiding pocket in which center rail 23 of movable frame 20 is free to move. An end gate 138 pivotally mounted through a pair of supports 140 on a rod 139 which extends between sides 135 and 136. The supports 140 are formed from elongated extensions of gate 138 which are folded at one end in such a manner that the folded end is bent back parallel to the unfolded end and a space is left between the ends in which rod 139 is free to move as shown in Figs. 10 and 11. Secured to gate 138 is a rod 141, the ends of which extend beyond the vertical sides of gate 138. Sides 135 and 136 of drawer C are cut away to form seats 135*b* and 136*b* for the extended ends of rod 141. Reinforcing straps 142 and 143 are fastened to sides 135 and 136, respectively, to surround the seats 135*b* and 136*b* as shown in Figs. 10, 11 and 12. A flat spring 144 is fixed to a flange 145 projecting from gate 138. The free ends of spring 144 extend into the spaces between the folded and unfolded ends of supports 140 to urge gate 138 in a direction away from rod 139, thereby holding supports 140 snugly on the rod. The bottom edge of gate 138 is provided with a pair of rollers 155 which permit free movement of cards beneath gate 138 when raised. An angular locking member 146 is pivotally mounted on rod 139 near drawer side 135. Leg 146*a* of locking member 146 extends between the folded and unfolded ends of the support 140 adjacent to side 135 as shown in Fig. 12. The other leg 146*b* is at right angles with leg 146*a* and extends inwardly toward end member 137 when gate 138 is in the closed position shown by solid lines in Fig. 11. The free end of leg 146*b* has a projection which is adapted to fit into a depression 135*c* on the inner surface of side 135 when the gate 138 is moved to the open position. The gate 138 is thus firmly held in the open position until the operating arms 119 and 120 move it to the closed position, as described hereinafter. It should be understood that only a small amount of pressure is necessary to move the projection from its seat in depression 135*c*. One leg of an angle-shaped stop 147 is secured to side 135 and the other leg is positioned in the path of leg 146*b* of locking member 146 to limit the opening movement of gate 138 to a position where it is in a plane parallel to the base 134**.

A card follower 148 (Fig. 13) extends between sides 135 and 136 of drawer C which are each formed with a channel portion defined by flanges **135*d*, 135*e* and 136*d*, 136*e* respectively. Card stop 148 has a slit near each side 135 and 136. Runners 149 and 150 are fastened to stop 148 on each side of the slit near side 135 and are adapted to slide within the channel between flanges 135*d* and 135*e*. A similar set of runners 151 and 152 are fastened to follower 148 on each side of the slit near side 136 and are adapted to slide within the channel between flanges 136*d* and 136*e*. It is thus seen that card follower 148 is free to move lengthwise within drawer C. A U-shaped cross rod 153 is provided to lock follower 148 in any desired position. The legs of cross rod 153 have flattened portions 153*a* at their extremities which fit into the slits between the runners 149, 150 and 151, 152. When cross rod 153 is in the position shown in Fig. 11, flattened portions 153*a* of cross rod 153 are effective to cam each set of runners 149, 150 and 151, 152 further apart so as to tightly engage flanges 135*d*, 135*e* and 136*d*, 136*e* respectively. The force of friction between the runners and the flanges hold card follower 148 firmly in place. When cross rod 153 is moved to the position shown in Fig. 10, the flattened portions 153*a* become ineffective and the runners 149, 150 and 151, 152 return to their normal position to slide freely within the channels. Flanges 158 and 159 extend inwardly toward the center of drawer C from runners 150 and 152, respectively, to act as a stop for rod 153 and limit the arc through which it can travel in its locking action. End member 137 of drawer C is provided with a handle 154 (Fig. 1) to facilitate removal of the card storage drawer from both the movable frame 20 and card stacker frame 85**.

When drawer C is mounted on movable frame 20, channel sections 80 and 84 frictionally engage flanges **135*a* and 136*a*, respectively. When the drawer is removed, this frictional force must be overcome and is such that the drawer is usually removed manually. Similarly, when drawer C is mounted on frame 85, channel sections 92 and 95 frictionally engage flanges 136*a* and 135*a***, respectively, and this frictional force can be overcome by manual removal of the drawer.

*Operation of the card stacker unit*

The operation of the stacker unit B will now be described. It has already been mentioned that the stacker unit B is secured to the accounting machine to replace the conventional stacking pocket. After the drawer C is removed from the movable frame 20, the machine operator mounts the drawer on frame 85 of the stacker unit with the gate 138 in the open position to allow cards to be stacked in the drawer. When the last card 73 is discharged from the machine and deposited into drawer C by stacking drum 161, the machine operator pulls rod 108 to the right by knob 113, as shown in Fig. 11, to move gate 138 to the closed position and give drawer C an initial push to facilitate removal from the frame 85. The drawer C is then removed manually and stored in a suitable filing cabinet if desired.

Referring now to Fig. 10, the drawer C is shown in the position where gate 138 is open to allow cards 73 to be deposited in the drawer. After drawer C is removed from movable frame 20, the gate 138 is manually moved about rod 139 to a position where it is held by locking member 146 in a plane parallel to base 134. As drawer C is being mounted on frame 85, the extended ends of rod 141 engage a pair of arcuate plates 157 fastened to the existing side frames of the accounting machine. Plates 157 exert a downward force on the ends of rod 141 causing locking member 146 to release gate 138. The ends of rod 141 are then guided by plates 157 into a seat on operating arms 119 and 120 beneath hooked fingers **119*a* and 120*a*, respectively. The arms 119 and 120 support gate 138 while cards are being deposited in drawer C. It should be noted that the mounting of drawer C on frame 85 causes base 134 to engage tail portion 126*a* of stop plate 126 to push block 123 against stop screw 156, as shown in Fig. 10, and rotate plate 126 clockwise about rod 125 against the pressure of spring 127 from the upright position shown in Fig. 11 to the reclining position of Fig. 10. It is thus seen that plate 126 cannot obstruct the passage of cards into drawer C when the drawer is properly mounted on frame 85. It should be noted that frame 85 is mounted to the machine in a slightly inclined position (Fig. 1) which causes block 123 to normally lay against stop screw 156** through force of gravity.

After the last card has been deposited in drawer C by stacking drum 161, rod 108 is moved to the right to the position shown by the solid lines in Fig. 11, rotating shaft 105 in a clockwise direction through gear segment 106. Links 113 and 114 move with shaft 105 to rotate operating arms 119 and 120 clockwise about shaft 162 through connecting links 115 and 116. The operating arms 119 and 120 overcome the pressure of spring 144 to slide gate 138 on rod 139 to the intermediate position shown in dotted lines in Fig. 11 and then downwardly to the closed position shown by solid lines in the same figure. As rod 108 moves to the right from the position shown in solid lines (Fig. 11) to the position shown in dotted lines, rollers 165 engage arms 99 and 100 to cam them in a clockwise direction about rod 98 and against pressure of spring 111 to the position shown in dotted lines. Arms 99 and 100 in turn pull U-shaped member 103 to the right to bring surfaces 103*a* against base 134 of drawer C which causes the drawer to move to the right to the position shown in dotted lines (Fig. 11). The pressure of base 134 on stop plate tail portion 126*a* is thus removed and plate 126 rotates counterclockwise about rod 125 under influence of spring 127 to the solid line position of Fig. 11. When pull rod 108 is released, coil spring 112 urges it to the left and the related mechanisms again are moved to positions shown in Fig. 10. The drawer is moved the remaining distance outwardly and to the right (Fig. 11) for removal from frame 85 by manual means through handle 154.

The operation of card follower 148 (Fig. 13) is within the discretion of the machine operator who may rotate the locking rod 153 to the position shown in Fig. 10 to release follower 148 for movement and slide the stop forward near gate 138. As the cards 73 are deposited in drawer C, the follower 148 is pushed before them until the cards stop feeding. Then the operator rotates locking rod 153 to the position of Fig. 11 to lock the follower 148 in place. This enables the stack of cards 73 to be maintained as a compact unit and prevents any shifting of the cards in the drawer C through handling. The operator may, if desired, wait until the cards have been stacked in the drawer C and then move the follower 148 to position described above.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an accounting machine including a magazine for holding a group of elements and a stacker to which said elements are directed, a holder full of elements, means for supporting said holder in a position above the magazine, a pair of fingers for engaging the bottom one of said elements, said fingers holding the entire group of said elements when said holder is removed from the position above the magazine, means for extending the fingers to move the group of elements toward said magazine, means for withdrawing said fingers from the position where the entire group of elements is held to a position where said fingers do not hold the group, whereby said elements are deposited into said magazine, and means for moving said elements from the magazine to the stacker where the elements are deposited into the empty holder which is placed on the stacker after removal from the position above the magazine.

2. In an accounting machine including a magazine for holding a group of elements and a stacker to which said elements are directed, a holder full of elements, means for supporting said holder in a position above the magazine, means for maintaining said holder in position, a pair of fingers for engaging the bottom one of said elements, said fingers holding the entire group of said elements when said holder is removed from the position above the magazine, means for extending the fingers to move the group of elements toward said magazine, means for withdrawing said fingers from the position where the entire group of elements is held to a position where said fingers do not hold the group, whereby said elements are deposited into said magazine, means for moving said elements from the magazine to the stacker where the elements are deposited into the empty holder which is placed on the stacker after removal from the position above the magazine, means for maintaining said holder in position on said stacker, and means at said stacker for moving said holder away from the stacker when the last element has been deposited in the holder.

3. In an accounting machine including a magazine for holding a group of elements, a holder full of elements, means for supporting said holder in a position above the magazine, a pair of fingers for engaging the bottom one of said elements, said fingers holding the entire group of said elements when said holder is removed from the position above the magazine, means for extending the fingers to move the group of elements toward said magazine, and means for withdrawing said fingers from the position where the entire group of elements is held to a position where said fingers do not hold the group, whereby said elements are deposited into said magazine.

4. In an accounting machine including a magazine for holding a group of elements, a holder full of elements located above the magazine in approximately a horizontal position, means for supporting said holder in said position, a pair of fingers for engaging the bottom one of said elements, said fingers holding the entire group of said elements when said holder is removed from the position above the magazine, means for aligning the elements with the magazine, means for extending the fingers to move the group of elements toward said magazine, and means for withdrawing said fingers from the position where the entire group of elements is held to a position where said fingers do not hold the group, whereby said elements are deposited into said magazine.

5. In a machine through which groups of record cards are fed to have printing or other operations performed thereby, a magazine for holding said groups of cards, a fixed frame positioned above said magazine, a movable frame pivotally mounted on said fixed frame, a card storage drawer having a group of cards therein and mounted on said movable frame, means for retaining said cards on the movable frame upon removal of said drawer from the movable frame, said retaining means including a pair of fingers for engaging the bottom one of said cards, means for moving said movable frame into alignment with said magazine, means for extending said fingers to move said cards into said magazine, means for moving said fingers from the position of engagement with the bottom card to a position of disengagement from said bottom card, whereby said group of cards are deposited into said magazine, means for advancing the cards through the machine, a stacker mechanism upon which said drawer is mounted after removal from said feeding mechanism, means for receiving said cards from the advancing means and depositing them into said drawer, and means in said stacker mechanism for moving said drawer outwardly on the stacker mechanism to facilitate removal from said mechanism.

6. In a machine through which groups of record cards are fed to have printing or other operations performed thereby, a magazine for holding said groups of cards, a fixed frame positioned above said magazine, a movable frame pivotally mounted on said fixed frame, a card storage drawer having a group of cards therein and mounted on said movable frame, means for retaining said cards on the movable frame upon removal of said drawer from the movable frame, said retaining means engaging the bottom one of said cards to hold the entire group of cards, means for moving said movable frame into alignment with said magazine, means for extending said retaining means to move said cards into said magazine, means for moving said retaining means from the position of engagement with the bottom card to a position of disengagement from said bottom card, whereby said group of cards is deposited into said magazine, means for advancing the cards through the machine to a receiving station, a frame fixed to said machine at the receiving station, an empty card storage drawer having an open end gate and mounted on said frame, means for moving cards into the empty drawer through the open gate, means for closing said end gate and means for moving said drawer away from the receiving station.

7. In a machine through which groups of record cards are fed to have printing or other operations performed thereby, a magazine for holding said groups of cards, a fixed frame positioned above said magazine, a movable frame pivotally mounted on said frame, a card storage drawer having a group of cards therein and mounted on said movable frame, a pair of card fingers for engaging the bottom one of said cards, said fingers holding the entire group of said cards on the movable frame upon removal of said drawer from the movable frame, means for moving said movable frame into alignment with said magazine, means for extending said card fingers to move said cards toward said magazine, means for withdrawing said card fingers from engagement with the bottom one of said cards, thereby causing the entire group of said cards to be deposited into said magazine, means for advancing the cards through the machine, a stacker mechanism upon which said drawer is mounted after removal from said feeding mechanism, means for receiving said cards from the advancing means and depositing them into said drawer, and means in said stacker mechanism for moving said drawer outwardly on the stacker mechanism preparatory to complete manual removal.

8. In a machine through which groups of elements are fed to have operations performed thereby, a magazine for holding said groups of elements, a fixed frame positioned above said magazine, a movable frame pivotally mounted on said frame, a holder having a group of elements therein and mounted on said movable frame, a pair of fingers for engaging the bottom one of said elements, said fingers holding the entire group of said elements on the movable frame upon removal of said holder from the movable frame, means for moving said movable frame into alignment with said magazine, means for extending said fingers to move said elements toward said magazine, means for withdrawing said fingers from engagement with the bottom one of said elements, thereby causing the entire group of said elements to be deposited into said magazine, means for advancing the elements through the machine, a stacker mechanism upon which said holder is mounted after removal from said feeding mechanism, means for receiving said elements from the advancing means and depositing them into said holder, and means in said stacker mechanism for giving said holder an initial movement away from the stacker mechanism preparatory to complete manual removal.

9. In an accounting machine including a magazine for holding a group of elements, a holder full of elements, means for supporting said holder in a position adjacent to the magazine so that the group of elements is arranged with one element lower than all other elements in the group, a pair of fingers for engaging the lowermost one of said elements, said fingers holding the entire group of said elements when said holder is removed from the position adjacent to the magazine, means for extending the fingers to move the group of elements toward said magazine, and means for withdrawing said fingers from the position where the entire group of elements is held to a position where said fingers do not hold the group, whereby said elements are deposited into said magazine.

10. In an accounting machine including a magazine for holding a group of elements, a holder full of elements, means for supporting said holder in a position adjacent to the magazine so that the group of elements is arranged with one element lower than all other elements in the group, means for retaining said elements on the supporting means when said holder is removed from the position adjacent to the magazine, said retaining means engaging the lowermost one of said elements to hold the entire group of said elements, means for extending the retaining means to move the entire group of elements towards said magazine, and means for withdrawing the retaining means from the position where the entire group of elements is held to a position where the retaining means does not hold the group, whereby said elements are deposited into said magazine.

References Cited in the file of this patent

UNITED STATES PATENTS

| | | |
|---|---|---|
| 676,032 | Elliott | June 11, 1901 |
| 1,807,309 | Elliott | May 26, 1931 |
| 1,962,146 | Hampton | June 12, 1934 |
| 2,251,221 | Cleven | July 29, 1941 |
| 2,359,850 | Hueber | Oct. 10, 1944 |
| 2,406,040 | Ryan | Aug. 20, 1946 |